United States Patent
Oki et al.

(10) Patent No.: US 8,003,015 B2
(45) Date of Patent: Aug. 23, 2011

(54) COMPOSITE POSITIVE ELECTRODE MATERIAL FOR LITHIUM ION BATTERY AND BATTERY USING THE SAME

(75) Inventors: Kazuo Oki, Wakayama (JP); Yasuhisa Fukumoto, Wakayama (JP); Ryuichi Akagi, Wakayama (JP); Kenichi Nishimura, Wakayama (JP); Taketo Kaneko, Yokohama (JP); Tamaki Miura, Yamato (JP); Takamitsu Saito, Yokohama (JP); Mikio Kawai, Yokosuka (JP); Mieko Kawai, legal representative, Yokosuka (JP)

(73) Assignees: Kao Corporation, Tokyo (JP); Nissan Motor Co., Ltd., Yokohama-Shi, Kangawa (JP)

( * ) Notice: Subject to any disclaimer, the term of this patent is extended or adjusted under 35 U.S.C. 154(b) by 130 days.

(21) Appl. No.: 12/305,914

(22) PCT Filed: Jun. 27, 2007

(86) PCT No.: PCT/JP2007/062846
§ 371 (c)(1),
(2), (4) Date: Dec. 19, 2008

(87) PCT Pub. No.: WO2008/001791
PCT Pub. Date: Jan. 3, 2008

(65) Prior Publication Data
US 2010/0140554 A1    Jun. 10, 2010

(30) Foreign Application Priority Data
Jun. 27, 2006    (JP) ................................ 2006-176828

(51) Int. Cl.
*H01B 1/04*    (2006.01)

(52) U.S. Cl. .................. 252/502; 252/182.1; 252/186.2; 252/299.01; 252/301.16; 429/223; 429/231.1; 429/231.7; 429/231.95; 429/232

(58) Field of Classification Search ............... 252/182.1, 252/186.2, 299.01, 301.16, 502; 429/231.95, 429/232, 223, 231.1, 231.7
See application file for complete search history.

(56) References Cited

U.S. PATENT DOCUMENTS
2003/0082453 A1 *    5/2003    Numata et al. ........... 429/231.95
(Continued)

FOREIGN PATENT DOCUMENTS
JP    4-162357 A    6/1992
(Continued)

OTHER PUBLICATIONS
Chinese Office Action issued on Sep. 27, 2010 in corresponding Chinese Patent Application No. 200780023797.5 with English translation thereof.

*Primary Examiner* — Khanh Tuan Nguyen
(74) *Attorney, Agent, or Firm* — Birch, Stewart, Kolasch & Birch, LLP

(57) ABSTRACT

The present invention provides a composite positive electrode material for a lithium ion battery, which is particularly excellent in high-rate discharge characteristics in a battery, and also provides a slurry, positive electrode and battery using the composite positive electrode material. The composite positive electrode material for a lithium ion battery contains: a positive electrode active material (a); a conductive material (b) having a primary particle diameter of 10 to 100 nm and/or a fibrous conductive material (c) having a fiber diameter of 1 nm to 1 μm; and a conductive material (d) having an aspect ratio of 2 to 50.

6 Claims, 3 Drawing Sheets

U.S. PATENT DOCUMENTS

2007/0003836 A1 * 1/2007 Suzuki et al. ................ 429/232

FOREIGN PATENT DOCUMENTS

| JP | 8-138678 A | 5/1996 |
| JP | 11-176446 * | 7/1999 |
| JP | 11-176446 A | 7/1999 |
| JP | 11-345607 A | 12/1999 |
| JP | 2000-21407 A | 1/2000 |
| JP | 2001-126733 A | 5/2001 |
| JP | 2004-14519 A | 1/2004 |
| JP | 2004-103392 A | 4/2004 |
| JP | 2004-179019 A | 6/2004 |

* cited by examiner

COMPOSITE POSITIVE ELECTRODE MATERIAL FOR LITHIUM ION BATTERY AND BATTERY USING THE SAME

TECHNICAL FIELD

The present invention relates to a composite positive electrode material for lithium ion batteries containing a positive electrode active material and a conductive material, and also relates to a slurry, positive electrode and battery using the composite positive electrode material.

BACKGROUND ART

Attentions have been recently focused on electromobiles, hybrid automobiles and fuel cell electric vehicles or the like due to the rising price of petroleum resources and rising international earth environment protection movement, and they have been partially put in practical use. Secondary batteries as an auxiliary power or the like are essential for these driver systems. In addition, high output secondary batteries capable of responding to the sudden starting and sudden acceleration of automobiles are desired. Alternatively, secondary batteries having high energy density are desired from the viewpoint of weight load to the automobiles and enhancement in fuel consumption. Because of these factors, lithium ion secondary batteries having the highest energy density in the secondary batteries and capable of expressing high output have been highly expected.

The lithium ion secondary battery, which uses an electrolysis solution containing a nonaqueous solvent containing lithium salts, has a structure where a positive electrode and a negative electrode are separated by a separator, the positive electrode provided with a positive electrode active material, the negative electrode provided with a negative electrode active material. Alternatively, since the conductivity of the positive electrode active material itself in the positive electrode is low, conductive materials such as carbon black are added in order to enhance the conductivity.

The above positive electrodes are generally produced by applying a slurry obtained by mixing active materials such as $LiMn_2O_4$, conductive materials such as carbon black, a binder, and a solvent onto a metallic foil as a current collector and drying the slurry. As a result, the fine structure of the positive electrode has a structure where particles made of a positive electrode active material having low conductivity and particles made of a conductive material having a particle diameter smaller than that of the particles made of the positive electrode active material are dispersed and combined.

In the positive electrode of the lithium ion secondary battery, lithium is stored in the positive electrode active material in discharging. In that case, electric discharge is advanced by the operation of lithium ions diffused to the positive electrode side and electrons electrically conducted from a positive electrode current collector. Alternatively, the electrons and ionized lithium are emitted from the positive electrode active material in charging. Therefore, the selection of a conductive material having high conductivity and the fine composite structure of the positive electrode active material and conductive material as factors which affect the characteristics, particularly high-rate discharge characteristics (high output) of the battery are very important.

For such reasons, some enhancements of the fine composite structure for the positive electrode have been attempted. For example, Patent Document 1 proposes a positive electrode material in which the surface of the positive electrode active material is covered with a conductive material in a covering rate of 15% or more by a process for mixing the positive electrode active material with the conductive material to apply a compression shearing stress in a dry state. Alternatively, Patent Document 1 discloses that graphite having a particle diameter of 1 to 20 μm is added when a positive electrode is produced using the positive electrode material.

Alternatively, Patent Document 2 attempts the improvement of a conductive path by adding carbon fiber into a positive electrode active material.

Furthermore, Patent Document 3 proposes a positive electrode formed by a composite material obtained by adding and mixing both carbon black and carbon fiber with a positive electrode active material. Alternatively, Patent Document 4 discloses that a composite material obtained by adding and mixing both spheroidal graphite and fibrous carbon with a positive electrode active material is used and the surface of the positive electrode active material is covered with the spheroidal graphite to reduce the resistance and the fibrous carbon forms conduction paths between the positive electrode active materials.

Patent Document 1: Japanese Patent Application Laid-Open No. 2004-14519
Patent Document 2: Japanese Patent Application Laid-Open No. 2004-103392
Patent Document 3: Japanese Patent Application Laid-Open No. 2004-179019
Patent Document 4: Japanese Patent Application Laid-Open No. 11-345607

DISCLOSURE OF THE INVENTION

Problems to be Solved by the Invention

However, the positive electrode material disclosed in Patent Document 1 is difficult to control the covering rate, and the surface of the positive electrode active material tends to be precisely covered with the conductive material. Therefore, the path of Li ions is blocked, and as a result, the high-rate discharge characteristics are difficult to be enhanced. Alternatively, it was confirmed that although the conductivity of the positive electrode active material is enhanced by covering the conductive material, the conductivity of the obtained positive electrode is insufficient, and that the enhancement effect of the conductivity is not so large even when making combination use of graphite.

Since the carbon fiber described in Patent Document 2 generally has poor contact efficiency with the positive electrode active material, the carbon fibers provide insufficient performance for the conductivity or the like of the positive electrode.

Furthermore, since the positive electrode disclosed in Patent Document 3 was formed by dry-mixing the carbon black, the carbon fiber, the positive electrode active material and the binder, adding the solvent, and using a slurry dispersed in the solvent, it was confirmed that the fine composite structure where the positive electrode active material and the conductive material are suitably arranged cannot be necessarily formed and the obtained positive electrode develops insufficient performance for the high-rate discharge characteristics.

Alternatively, as disclosed in Patent Document 4, even when the conduction paths between the positive electrode active materials to which the spheroidal graphite is stuck is formed by the fibrous carbon, the fibrous carbon is difficult to be appropriately arranged between the positive electrode active materials (particularly difficult in dry-mixing) since the aspect ratio (fibrous carbon having an aspect ratio of 75 is used in Example of Patent Document 4) of the fibrous carbon is generally large. Alternatively, it was confirmed that the positive electrode active material has unsuitable pore volume and the high-rate discharge characteristics of the positive electrode obtained become insufficient.

Then, the present invention provides a composite positive electrode material for lithium ion batteries, which is excellent in high-rate discharge characteristics in a battery, and also provides a slurry, positive electrode and battery using the composite positive electrode material.

Means for Solving the Problems

The present inventors have found that high-rate discharge characteristics in a battery are particularly enhanced by a composite positive electrode material obtained by mixing a composition with a conductive material having a specific aspect ratio, the composition obtained by dispersing a positive electrode active material and a specific conductive material in a solvent to a state where the positive electrode active material and the conductive material are forcibly dispersed, and then agglutinating the positive electrode active material and the conductive material, and the present invention have thus reached the completion.

That is, the present invention relates to a composite positive electrode material for a lithium ion battery containing:

a positive electrode active material (a);

a conductive material (b) having a primary particle diameter of 10 to 100 nm and/or a fibrous conductive material (c) having a fiber diameter of 1 nm to 1 μm; and a conductive material (d) having an aspect ratio of 2 to 50, wherein the composite positive electrode material for a lithium ion battery is obtained by mixing the conductive material (d) with a composition containing the positive electrode active material (a), and the conductive material (b) and/or the conductive material (c), the composition obtained by dispersing the positive electrode active material (a), and the conductive material (b) and/or the conductive material (c) in a solvent to a state where the positive electrode active material (a), and the conductive material (b) and/or the conductive material (c) are forcibly dispersed, and then agglutinating the positive electrode active material (a), and the conductive material (b) and/or the conductive material (c). Specifically, various kinds of physical property values in the present invention are values measured by methods described in Examples.

Furthermore, the present invention relates to a slurry, a positive electrode and a battery using the composite positive electrode material for lithium ion batteries as described above.

DESCRIPTION OF THE SYMBOLS

Figure 1:
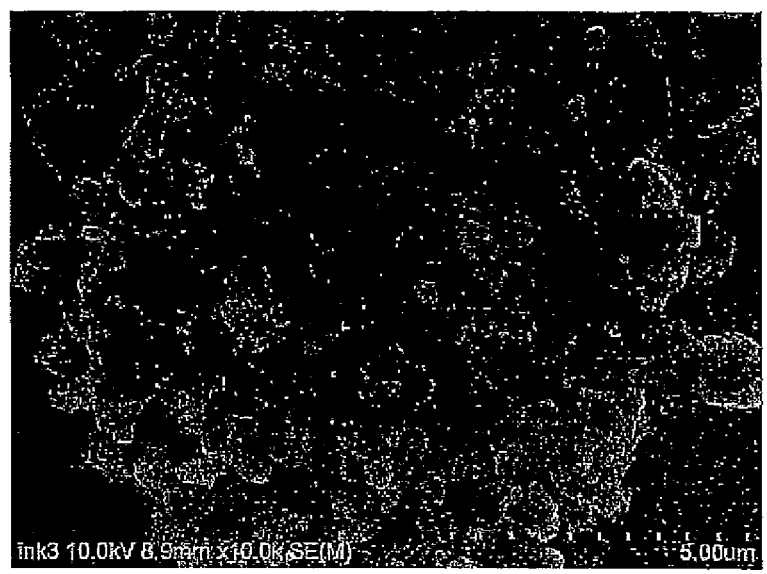
FIG. 1 is a scanning electron microscope (SEM) photograph of a composite positive electrode material obtained in Example 2.

31: non-bipolar type nonaqueous electrolyte lithium ion secondary battery

32: battery sheath material
33: positive electrode current collector
34: positive electrode active material layer
35: electrolyte layer
36: negative electrode current collector
37: negative electrode active material layer
38: power generation element
39: positive electrode (terminal) lead
40: negative electrode (terminal) lead
41: bipolar type nonaqueous electrolyte lithium ion secondary battery (bipolar battery)
42: current collector
43: positive electrode active material layer
44: negative electrode active material layer
45: bipolar type electrode
45a: uppermost electrode of electrode stacked body
45b: lowermost electrode of electrode stacked body
46: electrolyte layer
47: electrode stacked body (bipolar battery main body)
48: positive electrode lead
49: negative electrode lead
50: battery sheath material (exterior package)

BEST MODE FOR CARRYING OUT THE INVENTION

Hereafter, an embodiment of the present invention will be described in detail.

"Composite Positive Electrode Material for Lithium Ion Batteries"

The composite positive electrode material for lithium ion batteries of the present invention (hereinafter, referred to as the "composite positive electrode material") contains: a positive electrode active material (a); a conductive material (b) having a primary particle diameter of 10 to 100 nm and/or a fibrous conductive material (c) having a fiber diameter of 1 nm to 1 μm; and a conductive material (d) having an aspect ratio of 2 to 50.

The composite positive electrode material of the present invention is obtained by mixing the conductive material (d) with a composition containing the positive electrode active material (a), and the conductive material (b) and/or the conductive material (c), the composition obtained by dispersing the positive electrode active material (a), and the conductive material (b) and/or the conductive material (c) in a solvent to a state where the positive electrode active material (a), and the conductive material (b) and/or the conductive material (c) are forcibly dispersed, and then agglutinating the positive electrode active material (a), and the conductive material (b) and/or the conductive material (c). Examples of the general structures of the composite positive electrode materials include a structure where composite particles obtained by sticking the conductive material (b) and/or the conductive material (c) to the surface of at least one positive electrode active material (a) are formed and the conductive material (d) is interposed between the composite particles.

According to the present invention, there can be provided a composite positive electrode material for lithium ion batteries, which is excellent in high-rate discharge characteristics in a battery, and a slurry, a positive electrode and a battery using the composite positive electrode material. That is, the present inventors consider that a contact point between the positive electrode active material and the conductive material is increased by sticking the primary particles of the conductive material to the surface of the positive electrode active material by the agglutination after being forcibly dispersed, or by forming the composite particles having a structure where the surface of the positive electrode active material is surrounded by the aggregate of the primary particles of the conductive material by the agglutination after being forcibly dispersed, and electrons are sufficiently conducted to the surface of the positive electrode active material via the conductive material to enhance the conductivity. Further, the conductive material (for example, carbon black tied in queue) having a specific aspect ratio is mixed with the composite particles and the conductive material is interposed between the composite particles to sufficiently form conductive paths and smoothly permeate the electrolysis solution, thereby exhibiting a structure excellent in ion diffusion of Li ions. As a result, the present inventors consider that electric current higher as compared with that of the conventional Li ion secondary battery is allowed to flow at the time of discharge to obtain a Li ion battery excellent in high-rate discharge characteristics.

In the composite positive electrode material of the present invention, the "composite particles" in which the conductive material is brought into contact with the surface of the positive electrode active material can be formed. The composite particles include two aspects. A first aspect means composite particles obtained sticking the primary particles of the conductive material to the surface of the positive electrode active material. A second aspect means composite particles obtained by surrounding the positive electrode active material using the aggregate or the like of the primary particles of the conductive material. In the present invention, composite particles obtained by combining the first aspect with the second aspect are preferable. In the case, a composite structure obtained by surrounding the composite particles of the first aspect using the aggregate or the like of the primary particles of the conductive material is formed.

The conductive material and positive electrode active material are an aggregate of unit particles which are chemically stable in the solvent. The present inventors consider that the conductive material and the positive electrode active material are forcibly dispersed by ultrasonic waves or the like, preferably ultrasonic waves of a frequency of 15 to 25 kHz and an output of 100 to 500 W in the solvent to disperse the conductive material and the positive electrode active material in a state close to the unit particles. This unit particle is referred to as "primary particle" in the present invention.

As the positive electrode active material (a), any conventionally known materials can be used. Examples thereof include Li—Mn-based composite oxides such as $LiMn_2O_4$, Li—Co-based composite oxides such as $LiCoO_2$, Li—Ni-based composite oxides such as $LiNiO_2$, Li—Fe-based composite oxides such as $LiFeO_2$, and the like. The other examples include $Li_xCoO_2$, $Li_xNiO_2$, $MnO_2$, $LiMnO_2$, $Li_xMn_2O_4$, $Li_xMn_{2-y}O_4$, $\alpha$-$V_2O_5$, and $TiS_2$. Of these, $LiMn_2O_4$, $LiCoO_2$ and $LiNiO_2$ are preferable from the viewpoint of excellent thermal stability, capacity and output characteristics, and $LiMn_2O_4$ is more preferable.

The primary particle diameter of the positive electrode active material (a) is preferably 0.1 µm or more, more preferably 0.2 µm or more, and further more preferably 0.3 µm or more from the viewpoint of the safety, stability and cycle characteristics of the positive electrode active material. The primary particle diameter is preferably 10 µm or less, more preferably 5 µm or less, and further more preferably 2 µm or less from the viewpoint of composite agglutination in an agglutination step, reactivity and high-rate discharge characteristics. Piecing together the above viewpoints, the primary particle diameter is preferably 0.1 to 10 µm, more preferably 0.2 to 5 µm, and further more preferably 0.3 to 2 µm.

The conductive material (b), which has a primary particle diameter of 10 to 100 nm, forms composite particles when the conductive material (b) is compounded with the positive electrode active material (a).

As the conductive material (b), a carbonaceous material is preferable. Examples thereof include carbon black, and artificial or natural graphite powder. Of these, the carbon black is preferable from the viewpoint of adherability or contactness to the positive electrode active material after being forcibly dispersed, or conductivity or the like.

As the carbon black, there can be used one produced by any of decomposing methods such as a thermal black method and an acetylene black method, and incomplete combustion methods such as a channel black method, a gas furnace black method, an oil furnace black method, a turpentine soot method and a lamp black method. However, furnace black, acetylene black and ketjen black (registered trademark) are preferably used from the viewpoint of the conductivity, and of these, the ketjen black is more preferable. These may be used either alone or in combination of a plurality of kinds thereof.

The aspect of the composite particles obtained by compounding the conductive material (b) with the positive electrode active material (a) tends to be different according to the different structure constitution of the conductive material (b). The carbon black exists with particles of the carbon black fused (referred to as aggregate and conceptually compared to a bunch of grapes). The development degree of this aggregate is referred to as structure.

It is preferable that the carbon black suitable for the first aspect has a comparatively undeveloped structure constitution since the carbon black is preferably stuck in a primary particle state on the surface of the positive electrode active material. Specifically, the carbon black having a DBP (dibutyl phthalate) absorption amount of less than 200 $cm^3/100$ g is preferable.

It is preferable that the conductive material (b) suitable for the first aspect has the primary particle diameter of the conductive material that is preferably smaller than the primary particle diameter of the positive electrode active material in order to effectively stick the conductive material to the surface of the positive electrode active material. The primary particle diameter of the conductive material (b) is preferably ⅕ or less of that of the positive electrode active material, more preferably 1/10 or less, and still more preferably 1/15 or less. When the carbon black is particularly used, the primary particle diameter of the carbon black is preferably ⅕ or less of the primary particle diameter of the positive electrode active material, more preferably 1/10 or less, and still more preferably 1/15 or less.

Alternatively, the primary particle diameter of the above conductive material, preferably that of the carbon black is preferably 10 to 100 nm from the viewpoint of the easiness of the forcible dispersion and the adherability to the positive electrode active material, more preferably 15 to 80 nm, and still more preferably 20 to 50 nm. The carbon black having the primary particle diameter can be atomized to be surely stuck to the surface of the positive electrode active material and to further reduce the volume resistivity.

The composite particles in the first aspect have a structure where the above conductive material is stuck to the positive electrode active material. However, the coating ratio of the conductive material to the surface of the positive electrode active material can be easily controlled by the content ratio of the conductive material and positive electrode active material and the size ratio of particles, or the like. This coating ratio is preferably 5% or more, and more preferably 10% or more from the viewpoint of reducing the volume resistivity. The coating ratio is preferably 80% or less, and more preferably 70% or less from the viewpoint of suitably diffusing lithium ions. The coating ratio is preferably 5 to 80% from the viewpoint of reducing the volume resistivity and suitably diffusing the lithium ions, and more preferably 10 to 70%.

On the other hand, since it is preferable that the carbon black suitable for the second aspect has a structure easily surrounding the positive electrode active material, the carbon black having a comparatively developed structure constitution is preferable. Specifically, the carbon black having a DBP absorption amount of 200 to 800 cm$^3$/100 g is preferably used.

It is preferable that the conductive material (b) suitable for the second aspect is the carbon black having autoagglutination. The primary particle diameter of the carbon black measured by a scanning electron microscope is preferably 10 nm or more, more preferably 15 nm or more, and still more preferably 20 nm or more from the viewpoint of the easiness of primary dispersion. Alternatively, the primary particle diameter is preferably 100 nm or less, more preferably 80 nm or less and still more preferably 50 nm or less from the viewpoint of the easiness of the reagglutination after the dispersion.

It is preferable that the conductive material (b) and/or the conductive material (c) have autoagglutination in the solvent when the composite particles in the second aspect are formed in the present invention. The conductive material having autoagglutination may have a property of autoagglutinating when the conductive material is forcibly dispersed in the solvent used for dispersing and is then left. Examples thereof include carbon black having autoagglutination, and fibrous carbon such as carbon fiber having autoagglutination and carbon nanotube (CNT) (the conductive material (c) will be described later).

It is preferable that the carbon black having autoagglutination has a large structure capable of including and agglutinating the positive electrode active material. The measure of the structure of the carbon black can be determined from the DBP absorption amount. From the viewpoint of good permeating of an electrolysis solution and securement of the diffusion path of Li ions, the DBP absorption amount of the carbon black used is preferably 200 cm$^3$/100 g or more, more preferably 250 cm$^3$/100 g or more, and still more preferably 300 cm$^3$/100 g or more. Alternatively, from the viewpoint of suppressing the reduction in electrode density, the DBP absorption amount is preferably 800 cm$^3$/100 g or less, more preferably 700 cm$^3$/100 g or less, and still more preferably 600 cm$^3$/100 g or less. Piecing together the above viewpoints, the DBP absorption amount is preferably 200 to 800 cm$^3$/100 g, more preferably 250 to 700 cm$^3$/100 g, and further more preferably 300 to 600 cm$^3$/100 g.

The content of the conductive material (b) is preferably 0.2 part by weight or more relative to 100 parts by weight of the positive electrode active material, more preferably 0.5 part by weight or more, and further more preferably 1 part by weight or more from the viewpoint of suitably forming the composite particles of the first or second aspect. The content is preferably 20 parts by weight or less, more preferably 10 parts by weight or less, and further more preferably 5 parts by weight or less from the viewpoint of the balance of the volume resistivity and the total pore volume ratio. Piecing together the above viewpoints, the content is preferably 0.2 to 20 parts by weight, more preferably 0.5 to 10 parts by weight, and further more preferably 1 to 5 parts by weight.

When the composite particles obtained by combining the first aspect with the second aspect are formed in the present invention, it is preferable to make combination use of the carbon black suitable for the first aspect and the carbon black suitable for the second aspect or the conductive material (c). Thereby, the composite particles in which the composite particles of the first aspect are surrounded by the aggregate or the like of the primary particles of the conductive material are formed. That is, in this aspect, there are formed the composite particles obtained by sticking the carbon black suitable for the first aspect to the surface of the positive electrode active material (a) and surrounding the positive electrode active material (a) to which the carbon black is stuck using the aggregate of the carbon black primary particles suitable for the second aspect and/or the conductive material (c).

The conductive material (c) is suitably used to form the composite particles of the second aspect. As the conductive material, fibrous carbon is preferable. The fibrous carbon is preferably agglutinated in the shape of incidental looping by entangling fibers. The carbon is dispersed by applying a dispersing agent and a mechanical stress in the presence of the positive electrode active material, and the dispersion is then stopped to cause autoagglutination while taking in the positive electrode active material in autoagglutinating to enable the formation of the composite particles of the second aspect.

The fibrous carbon as the conductive material (c) are suitably used carbon fiber obtained from a polymer typified by polyacrylonitrile (PAN) as a raw material, pitch-based carbon fiber obtained from pitch as a raw material, vapor phase epitaxy-based carbon fiber (for example, VGCF: registered trademark) that is a carbon nanotube (a cylindrical-shaped object ("Biryushi Kougaku Taikei, Volume I, 1st edition, pp. 651, Fujitec Corporation) formed by winding a sheet of graphite, i.e., a graphene sheet) and that is obtained from hydrocarbon gas as a raw material, and so-called a narrowly-defined carbon nanotube (hereinafter, the narrowly-defined carbon nanotube is merely referred to as carbon nanotube) obtained by an arc discharge method, a laser evaporating method and a chemistry vapor growth method or the like. The fibrous carbon having a thin fiber diameter is preferable from the viewpoint of constructing more conductive paths. The VGCF and the carbon nanotube are suitably used, and of these, the carbon nanotube is preferably used. The carbon nanotube can be obtained by, for example, an arc discharge method for evaporating a graphite electrode by arc discharge under atmosphere gas such as He, Ar, $CH_4$ and $H_2$, an arc discharge method for evaporating a graphite electrode including metal catalysts such as Ni, Co, Y, Fe by arc discharge, a laser evaporating method for applying YAG laser to graphite with which metal catalysts such as Ni—Co and Pd-Rd are mixed to evaporate the graphite and sending out the graphite to an electric furnace heated at about 1200° C. by Ar current, and an HiPCO method for thermally decomposing carbon monoxide at a high pressure using pentacarbonyl iron (Fe(CO)$_5$) for a catalyst, or the like. Referring to the aspect ratio of the carbon nanotube, for example, the smaller the concentration ratio of hydrocarbon (benzene or the like) to atmosphere gas such as hydrogen gas is, the thinner the diameter of the carbon nanotube to be produced is, and the larger the aspect ratio is. Alternatively, the shorter the reaction time is, the thinner the diameter of the carbon nanotube to be produced is, and after all, the larger the aspect ratio is.

In the present invention, the aspect ratio of the fiber diameter (W) to the fiber length (L) of the fibrous carbon, i.e., L/W becomes important in view of the formation mechanism of the composite particles of the above second aspect. Furthermore, the aspect ratio of the fibrous carbon is preferably 50 or more, more preferably 100 or more, and further more preferably 200 or more from the viewpoint of the conductivity. The aspect ratio is preferably 20,000 or less, more preferably 5,000 or less, and furthermore preferably 1000 or less from the viewpoint of the dispersibility of the fibrous carbon. Piecing together the above viewpoints, the aspect ratio is preferably 50 to 20,000, more preferably 100 to 5,000, and further more preferably 200 to 500.

That is, since the fibrous carbon having an aspect ratio of 50 to 20000 generally has high autoagglutination, and has high capability for autoagglutinating to generate the composite particles when the fibrous carbon is forcibly dispersed in the solvent and is then left to cause the autoagglutination, the fibrous carbon can be suitably used in the present invention.

In that case, the fiber length of the fibrous carbon is preferably 50 nm or more, more preferably 500 nm or more, and further more preferably 1 μm or more. Alternatively, the fiber length is preferably 50 μm or less, more preferably 30 μm or less, and further more preferably 10 μm or less from the viewpoint of the smoothness of the surface of the positive electrode produced using the composite positive electrode material of the present invention. Piecing together the above viewpoints, the fiber length is preferably 50 nm to 50 μm, more preferably 500 nm to 30 μm, and further more preferably 1 to 10 μm.

Alternatively, the fiber diameter of the fibrous carbon is preferably 1 nm to 1 μm from the viewpoint of the fibrous carbon brought into contact with the surface of the positive electrode active material much more to establish a conductive path, more preferably 1 to 500 nm, and still more preferably 1 to 300 nm.

The content of the conductive material (c) is preferably 0.2 part by weight or more relative to 100 parts by weight of the positive electrode active material, more preferably 0.5 part by weight or more, and further more preferably 1 part by weight or more from the viewpoint of effectively developing an autoagglutination force in the agglutination step. Alternatively, the content is preferably 20 parts by weight or less, more preferably 10 parts by weight or less, and further more preferably 5 parts by weight or less from the viewpoint of the balance of the volume resistivity and the total pore volume ratio. Piecing together the above viewpoints, the content is preferably 0.2 to 20 parts by weight, more preferably 0.5 to 10 parts by weight, and further more preferably 1 to 5 parts by weight.

When the composite particles are formed using the conductive material (b) and/or the conductive material (c), the total content of the conductive material is preferably 0.2 part by weight or more relative to 100 parts by weight of the positive electrode active material, more preferably 0.5 part by weight or more, and further more preferably 1 part by weight or more from the viewpoint of enhancing the conductivity (reducing the volume resistivity). The total content is preferably 50 parts by weight or less, more preferably 30 parts by weight or less, and furthermore preferably 15 parts by weight or less from the viewpoint of the energy density of the composite particles. Piecing together the above viewpoints, the total content is preferably 0.2 to 50 parts by weight, more preferably 0.5 to 30 parts by weight, and further more preferably 1 to 15 parts by weight.

In the present invention, both the first and second aspects have an effect smoothly flowing electrons to the positive electrode active material. However, the second aspect is particularly preferable in view of stimulating the movement of the electrons and being difficult to inhibit the diffusion of the Li ions. Furthermore, the composite particles obtained by combining the first aspect with the second aspect using the conductive material having autoagglutination when the composite particles of the first aspect is formed is more preferable.

When a conductive material having low autoagglutination is used in a method for forming the composite particles as described above, composite particles containing a positive electrode active material and a conductive material can be obtained by removing a solvent from a slurry obtained by dispersing the positive electrode active material and the conductive material in a state where at least the positive electrode active material and the conductive material are forcibly dispersed in the solvent.

Alternatively, when the conductive material having autoagglutination is used, the composite particles can be formed by a method containing a dispersing step of dispersing at least the conductive material having autoagglutination and the positive electrode active material in the solvent to be in a forcibly dispersed state and an agglutination step of agglutinating the conductive material together with the positive electrode active material in the solvent to obtain agglutination particles.

The "forcibly dispersed state" in the present invention means a dispersion state where when the slurry is sampled and diluted to a predetermined concentration, and an average particle diameter is promptly measured by a particle size distribution measuring device, the average particle diameter does not surpass 130% of the primary particle diameter of the positive electrode active material (a specific measuring method will be described later in the measuring method of the primary particle diameter of the positive electrode active material from the viewpoint of the comparison with the primary particle diameter of the positive electrode active material). That is, in this state, the average particle diameter to be measured is close to the primary particle diameter of the positive electrode active material by converting an initial agglutinated state into the forcibly dispersed state (the dispersion state of the conductive material is also reflected by this measured value), and the forcibly dispersed state can be grasped by this phenomenon.

As the solvent used for dispersing, N-methyl-2-pyrolidone (NMP, boiling point: 202° C.), dimethylformamide (DMF, boiling point: 153° C.), dimethylacetamide (boiling point: 165° C.), methyl ethyl ketone (boiling point: 79.5° C.), tetrahydrofuran (boiling point: 66° C.), acetone (boiling point: 56.3° C.), ethanol (boiling point: 78.3° C.) and ethyl acetate (boiling point: 76.8° C.) or the like are suitably used. Of these, NMP having high boiling point is preferably used as the solvent when obtaining the composite particles in a slurry state. Alternatively, methyl ethyl ketone and ethanol having low boiling point are preferable when obtaining the composite particles in a drying particle state.

The boiling point of the solvent is preferably 250° C. or less, more preferably 100° C. or less, and further more preferably 80° C. or less from the viewpoint of the easiness of drying. When the conductive material having low autoagglutination is particularly used or when the composite particles are obtained in a drying particle state, the boiling point of the solvent is preferably 100° C. or less.

The amount of the solvent to be used is preferably 50 parts by weight or more relative to 100 parts by weight of the positive electrode active material (a) from the viewpoint of effectively dispersing the conductive material and the positive electrode active material or the like, and more preferably 100 parts by weight or more. Alternatively, the amount is preferably 1000 parts by weight or less from the viewpoint of the complication for drying the solvent or the like, and more preferably 800 parts by weight or less. Piecing together the above viewpoints, the amount is preferably 50 to 1000 parts by weight, and more preferably 100 to 800 parts by weight.

Examples of the dispersers include an ultrasonic type disperser, a stirring type disperser, a high speed rotating shear type disperser, a mill type disperser, and a high-pressure injection type disperser. When the disperser is used in the step forcibly dispersing, the ultrasonic type disperser and the high-pressure injection type disperser are suitably used.

Alternatively, as the disperser causing grinding operation, the mill type disperser is suitably used. The conductive material may be previously prepared by wet grinding or dry grinding and the conductive material may be dispersed in the solvent.

The method using the dispersing agent is particularly effective for suitably dispersing the conductive material. When the dispersing agent is used, an anionic, nonionic or cationic surfactant, or a polymer dispersing agent can be used as the dispersing agent. However, the polymer dispersing agent is preferably used in view of the dispersion performance.

Various compounds can be used as the polymer dispersing agent. However, a polycarboxylic acid-based polymer dispersing agent having a plurality of carboxyl groups in a molecule, a polyamine-based polymer dispersing agent having a plurality of amino groups in a molecule, a polymer dispersing agent containing a plurality of amide groups in a molecule, and a polymer dispersing agent having a plurality of polycyclic aromatic compounds in a molecule are preferable.

Examples of the polyamine-based polymer dispersing agents include a comb polymer prepared by grafting polyester to polyamine such as polyalkylene amine, polyallylamine, and N,N-dimethylaminoethyl metacrylate.

Examples of the polycarboxylic acid-based polymer dispersing agents include a copolymer of (meth) acrylic acid and (meth)acrylic acid ester, an amide compound and ester compound of an anhydrous maleic acid copolymer and various amines such as alkylamine or alcohol, and a comb polymer prepared by grafting a polyester of a polycarboxylic acid such as a poly(meth) acrylic acid copolymer and a polyalkylene glycol. In this specification, the (meth)acrylic acid means an acrylic acid or a methacrylic acid.

Examples of the polymer dispersing agents having a plurality of amide groups in a molecule include a copolymer of polyamide, polyvinylpyrrolidone and poly N,N-dimethyl acryl amide obtained by a condensation reaction, and a comb polymer prepared by grafting polyester or polyalkylene glycol thereto.

Examples of the polymer dispersing agents containing the polycyclic aromatic compound include a copolymer of a vinyl monomer having pyrene and a quinacridone skeleton and various monomers. The above dispersing agents may be used either alone or in combination of a plurality of kinds thereof.

When the dispersing agent is used, the additive amount of the dispersing agent is preferably 0.1 to 20 parts by weight relative to 100 parts by weight of objects to be dispersed (the positive electrode active material+the conductive material in the present invention) from the viewpoint of suitable dispersion, and more preferably 0.5 to 10 parts by weight.

The step of forming the composite particles removes the solvent from the slurry obtained by the above dispersion to obtain the composite particles. The solvent can be removed from the slurry by heating evaporation, decompression distillation, spray dry and freeze-drying or the like.

Alternatively, the composite particles can be formed by agglutinating the conductive material together with the positive electrode active material in the solvent to obtain the composite particles. This agglutination step can use a technique for stopping a disperser to accelerate the autoagglutination of the conductive material to obtain a slurry containing the composite particles since the conductive material having autoagglutination autoagglutinates easily, or a technique for distilling a solvent and forcibly agglutinating the conductive material to obtain a powder of the agglutination particles in order to further enhance an agglutination force in the solvent.

The average particle diameter of the composite particles is preferably 0.1 µm or more, more preferably 0.5 µm or more, and furthermore preferably 1 µm or more from the viewpoint of properly securing the pore volume of the composite particles. The average particle diameter is preferably 20 µm or less, more preferably 15 µm or less, and furthermore preferably 10 µm or less from the viewpoint of the surface property of the positive electrode obtained using the composite particles. Piecing together the above viewpoints, the average particle diameter is preferably 0.1 to 20 µm, more preferably 0.5 to 15 µm, and further more preferably 1 to 10 µm.

The conductive material (d) has an aspect ratio of 2 to 50. This conductive material is interposed between the composite particles. When the carbon fiber having an aspect ratio larger than that of the range is used in place of the conductive material (d), the lithium ions diffuse insufficiently. Alternatively, the carbon fiber is difficult to be appropriately arranged between the composite particles, and the high-rate discharge characteristics of the positive electrode obtained tend to be insufficient.

As the conductive material (d), the carbon black having a structure constitution is preferable. The present inventors consider that voids for diffusing Li ions can be suitably formed by the development of the structure constitution in the carbon black having the aspect ratio of such a range, and the carbon black can be interposed between the composite particles to suitably form the conductive path.

The following can be used as the carbon black. The carbon black may have an agglutination structure where primary particles tied in queue are branched in an irregular chain-like form. When such particles are observed by the scanning electron microscope, the aspect ratio of the diameter of the longest diameter (L) and shortest diameter (W), i.e., L/W becomes important.

The aspect ratio of the conductive material (d) is 2 or more, preferably 3 or more, and more preferably 3.5 or more from the viewpoint of the conductivity of the composite positive electrode material. The aspect ratio is 50 or less, preferably 20 or less, and more preferably 10 or less from the viewpoint of suitably diffusing the lithium ions. Piecing together the above viewpoints, the above aspect ratio is 2 to 50, preferably 3 to 20, and more preferably 3.5 to 10.

The carbon black having a high aspect ratio, which has an agglutination structure, generally has a large DBP absorption amount. Therefore, the DBP absorption amount of the carbon black having the structure constitution is preferably 100 $cm^3$/100 g or more, more preferably 120 $cm^3$/100 g or more, and still more preferably 150 $cm^3$/100 g or more. Alternatively, the DBP absorption amount is preferably 400 $cm^3$/100 g or less from the viewpoint of suppressing the reduction in electrode density, more preferably 300 $cm^3$/100 g or less, still more preferably 200 $cm^3$/100 g or less. Piecing together the above viewpoints, the DBP absorption amount is preferably 100 to 400 $cm^3$/100 g, more preferably 120 to 300 $cm^3$/100 g, still more preferably 150 to 200 $cm^3$/100 g.

Alternatively, the specific surface area of the carbon black is preferably 20 $m^3$/g or more, more preferably 30 $m^3$/g or more, and further more preferably 40 $m^3$/g or more from the viewpoint of suitably securing the pore volume of the positive electrode. The specific surface area is preferably 2,000 $m^3$/g or less, more preferably 500 $m^3$/g or less, and further more preferably 100 $m^3$/g or less from the viewpoint of moderately suppressing the capacity of the positive electrode to secure the compactness. Piecing together the above viewpoints, the specific surface area is preferably 20 to 2,000 m$^3$/g, more preferably 30 to 500 m$^3$/g, and further more preferably 40 to 100 m$^3$/g.

As the carbon black having the above structure constitution, the carbon black having the above physical property, of the carbon blacks used as the conductive material (b) can be used. More specific examples thereof include conductive carbon black produced by a Furnace process for thermally decomposing carbon hydride as a raw material using combustion heat of crude oil or gas to produce carbon black, ketjen black obtained by a gasification process of heavy oil, and acetylene black obtained by thermally decomposing acetylene gas. For example, ketjen black EC manufactured by Lion Corporation, Balkan XC-72 manufactured by Cabot Corporation, and Printex L6 and Printex XE2 manufactured by Degussa Corporation, or the like are available commercially.

The particle diameter of the carbon black having the structure constitution, which is represented by the average particle diameter (agglutination particle diameter) of the agglomerate constituted by connecting the primary particles, is determined by measuring the particle size distribution using a laser diffraction/dispersion type particle distribution measurement device LA750 (manufactured by Horiba, Ltd.). This average particle diameter is preferably 0.05 to 10 μm from the viewpoints of the conductivity of the positive electrode and the smoothness of a coating film when coating the positive electrode material to form the coating film, more preferably 0.08 to 5 μm, and still more preferably 0.1 to 2 μm.

The compounding amount of the conductive material (d) is preferably 2 parts by weight or more relative to 100 parts by weight of the positive electrode active material from the viewpoint of reducing the volume resistivity caused by forming the conductive path of the positive electrode obtained, more preferably 4 parts by weight or more, and still more preferably 8 parts by weight or more. Alternatively, the compounding amount is preferably 50 parts by weight or less from the viewpoint of enhancing the energy density of the composite material for positive electrodes, more preferably 30 parts by weight or less, and still more preferably 15 parts by weight or less. Piecing together the above viewpoints, the compounding amount is preferably 2 to 50 parts by weight, more preferably 4 to 30 parts by weight, and further more preferably 8 to 15 parts by weight.

The total mixing amount of the conductive materials (b) to (d) is preferably 3 parts by weight or more relative to 100 parts by weight of the positive electrode active material (a), more preferably 5 parts by weight or more, and further more preferably 10 parts by weight or more from the viewpoint of reducing the volume resistance of the composite positive electrode material. The total compounding amount is preferably 50 parts by weight or less, more preferably 30 parts by weight or less, and further more preferably 15 parts by weight or less from the viewpoint of enhancing the energy density of the composite positive electrode material. Piecing together the above viewpoints, the total compounding amount is preferably 3 to 50 parts by weight, more preferably 5 to 30 parts by weight, and further more preferably 10 to 15 parts by weight.

The volume resistivity of the obtained composite material for positive electrodes is preferably 5 Ω·cm or less from the viewpoint of enhancing the high-rate discharge characteristics, more preferably 3 Ω·cm or less, and still more preferably 2 Ω·cm or less.

The total pore volume of the composite positive electrode material of the present invention after distilling the solvent thereof is preferably 0.8 cc/g or more, more preferably 0.9 cc/g or more, and further more preferably 1 cc/g or more from the viewpoint of enhancing the high-rate discharge characteristics. The total pore volume is preferably 25 cc/g or less, more preferably 10 cc/g or less, and further more preferably 5 cc/g or less from the viewpoint of appropriately securing the energy density of the positive electrode. Piecing together the above viewpoints, the total pore volume is preferably 0.8 to 25 cc/g, more preferably 0.9 to 10 cc/g, and further more preferably 1 to 5 cc/g. The present inventors consider that such a total pore volume can smoothly diffuse the Li ions. On the other hand, a slurry for positive electrodes for lithium ion batteries of the present invention contains the composite positive electrode material of the present invention described above and a binder. Alternatively, the positive electrode for lithium ion batteries of the present invention contains the composite positive electrode material of the invention as described above and a binder.

The positive electrode active material (a) and the conductive materials (b) to (d) were described above. However, furthermore, the present invention can contain the other positive electrode materials optionally if needed. These are not particularly limited, and conventionally known materials can be broadly applied. Hereinafter, these will be described.

Another examples of the positive electrode materials capable of being used for the composite positive electrode material for lithium ion batteries of the present invention include a binder, a supporting electrolyte (lithium salt) for enhancing the ion conductivity, a polymer gel or a solid electrolyte (a host polymer, an electrolysis solution or the like). When a polymer gel electrolyte is used for a battery electrolyte layer, the positive electrode material may contain a conventionally known binder and a conductive material for enhancing the electronic conductivity or the like. The positive electrode material may not contain a host polymer as a raw material of a polymer electrolyte, an electrolysis solution and a lithium salt or the like. Even when a solution electrolyte is used for the battery electrolyte layer, the positive electrode material may not contain the host polymer as the raw material of the polymer electrolyte, the electrolysis solution and the lithium salt or the like.

Any of conventional binders used for forming the positive electrode can be used as the binder. Polyvinylidene difluoride, polyamide imide, polytetrafluoroethylene, polyethylene, polypropylene and polymethylmethacrylate or the like can be suitably used.

The above polymer gel electrolyte contains a solid polymer electrolyte having ion conductivity and an electrolysis solution used in conventionally known nonaqueous electrolyte lithium ion batteries. Furthermore, the polymer gel electrolyte contains one obtained by holding the same electrolysis solution in the skeleton of a polymer having no lithium ion conductivity.

Herein, the electrolysis solution (the supporting electrolyte and a plasticizer) contained in the polymer gel electrolyte is not particularly limited. Conventional known various electrolysis solutions can be suitably used.

There can be used an electrolysis solution using a plasticizer (an organic solvent) such as an aprotic solvent containing, for example, at least one kind of lithium salt (a supporting electrolyte) selected from inorganic acid negative ion salts such as LiPF$_6$, LiBF$_4$, LiClO$_4$, LiAsF$_6$, LiTaF$_6$, LiAlCl$_4$ and Li$_2$B$_{10}$Cl$_{10}$ or the like and organic acid negative ion salts such as LiCF$_3$SO$_3$, Li (CF$_3$SO$_2$)$_2$N and Li (C$_2$F$_5$SO$_2$)$_2$N, and at least one kind selected from cyclic carbonates such as propylene carbonate and ethylene carbonate; chain carbonates such as dimethyl carbonate, methyl ethyl carbonate and diethyl carbonate; ethers such as tetrahydrofuran, 2-methyltetrahydrofuran, 1,4-dioxane, 1,2-dimethoxyethane, and 1,2-dibutoxyethane; lactones such as γ-butyrolactone; nitrils such as acetonitrile; esters such as methyl propionate; amides such as dimethylformamide; methyl acetate, and methyl formate. However, the electrolysis solution is not limited thereto.

Examples of the solid polymer electrolytes having ion conductivity include known solid polymer electrolytes such as polyethylene oxide (PEO), polypropylene oxide (PPO) and a copolymer thereof.

As the polymer used for the polymer gel electrolyte and having no lithium ion conductivity, polyvinylidene difluoride (PVDF), polyvinylchloride (PVC), polyacrylonitrile (PAN), polymethylmethacrylate (PMMA) or the like can be used. However, the polymer is not limited thereto.

Since PAN and PMMA or the like are included in the category having little ion conductivity, PAN and PMMA can be also considered as the above polymer having ion conductivity. However, herein, PAN and PMMA are exemplified as the polymer used for the polymer gel electrolyte and having no lithium ion conductivity.

As the above supporting electrolyte for enhancing the ion conductivity, for example, inorganic acid negative ion salts such as $LipF_6$, $LiBF_4$, $LiClO_4$, $LiAsF_6$, $LiTaF_6$, $LiAlCl_4$ and $Li_2B_{10}Cl_{10}$, organic acid negative ion salts such as, $Li(CF_3SO_2)_2N$, and $Li(C_2F_5SO_2)_2N$, or a mixture thereof or the like can be used. However, the supporting electrolyte is not limited thereto.

Although the ratio (mass ratio) of the host polymer and electrolysis solution in the polymer gel electrolyte may be determined according to an intended use or the like, the ratio is in the range of 2:98 to 90:10.

The mixing amount of the binder, polymer electrolyte (the host polymer and the electrolysis solution or the like) and lithium salt or the like other than the active material and the conductive material in the composite positive electrode material of the present invention should be determined in view of the intended use of the battery (output significant concern and energy significant concern or the like) and the ion conductivity.

When the slurry for positive electrodes for lithium ion batteries of the present invention contains a solvent, any of conventional solvents used for forming the positive electrode can be used as the solvent. For example, a solvent or the like used for forming the composite positive electrode material can be used.

The viscosity of the slurry is preferably 1,000 cps or more, and more preferably 2,000 cps or more from the viewpoint of the thickness of the obtained electrode. The viscosity is preferably 15,000 cps or less, and more preferably 10,000 cps or less from the viewpoint of the coatability of the slurry to the current collector.

The solid content concentration of the slurry is preferably 20% by weight or more, and more preferably 35% by weight or more from the viewpoint of the preferable viscosity of the slurry. Alternatively, the solid content concentration is preferably 60% by weight or less, and more preferably 45% by weight or less from the viewpoint of the preferable viscosity of the slurry.

Next, the composite positive electrode material according to the present invention can be broadly applied to the positive electrode for lithium ion batteries and lithium ion batteries. In the lithium ion battery, the composite positive electrode material has small expansion and contraction, and exhibits sufficient operation effect using a small amount of a conductive material satisfying the above requirements. Alternatively, since the positive electrode for lithium ion batteries includes a current collector and a positive electrode active material layer which constitute a lithium ion battery to be described below, these will be described in the following description of the lithium ion battery. In the case of a bipolar type lithium ion battery, the above positive electrode for lithium ions means a bipolar electrode.

That is, a battery capable of applying the composite positive electrode material of the present invention is a lithium ion battery capable of expecting high output and high capacity. This battery can attain high energy density and high output density, and can be suitably used for drive power supplies or the like for vehicles. In addition, the battery can be also sufficiently applied to lithium ion batteries for portable devices such as a cellular phone. Therefore, the lithium ion battery using the composite positive electrode material of the present invention will be described in the following description. However, the present invention should not be limited thereto in any way.

That is, the lithium ion battery as the object of the present invention may be the lithium ion battery using the composite positive electrode material of the present invention described above. The other constituent features should not be limited in any way. For example, when the above lithium ion battery is distinguished according to use states, the lithium ion battery can be applied to any of use states of a primary battery and secondary battery. When the above lithium ion battery is distinguished according to states and structures, the lithium ion battery can be applied to any of conventionally known states and structures such as a stacked type (flat type) battery and a winding type (cylinder type) battery. Alternatively, according to an electric connection state (electrode structure) in the lithium ion battery, the lithium ion battery can be applied to any of the above non-bipolar type battery (internal parallel connection type) and a bipolar type battery (internal series connection type).

The bipolar type battery has a voltage of a unit battery higher than that of a usual battery, and is excellent in capacity and output characteristics. Since a polymer battery causes no liquid leakage, advantageously, the polymer battery has no problem of liquid junction, has high reliability, and can form a nonaqueous battery excellent in the output characteristics with a simple constitution. Alternatively, the reliability of the battery over a long period of time can be secured by seal techniques such as a simple thermo compression bonding by adopting the stacked type (flat type) battery structure, and the polymer battery is advantageous in view of cost or workability.

Therefore, a non-bipolar type nonaqueous electrolyte lithium ion secondary battery using the composite positive electrode material of the present invention and a bipolar type nonaqueous electrolyte lithium ion secondary battery will be very briefly described with the reference to the drawings in the following description. However, the present invention should not be limited thereto. That is, constituent features other than the above electrode material described above should not be limited in any way.

Figure 2:
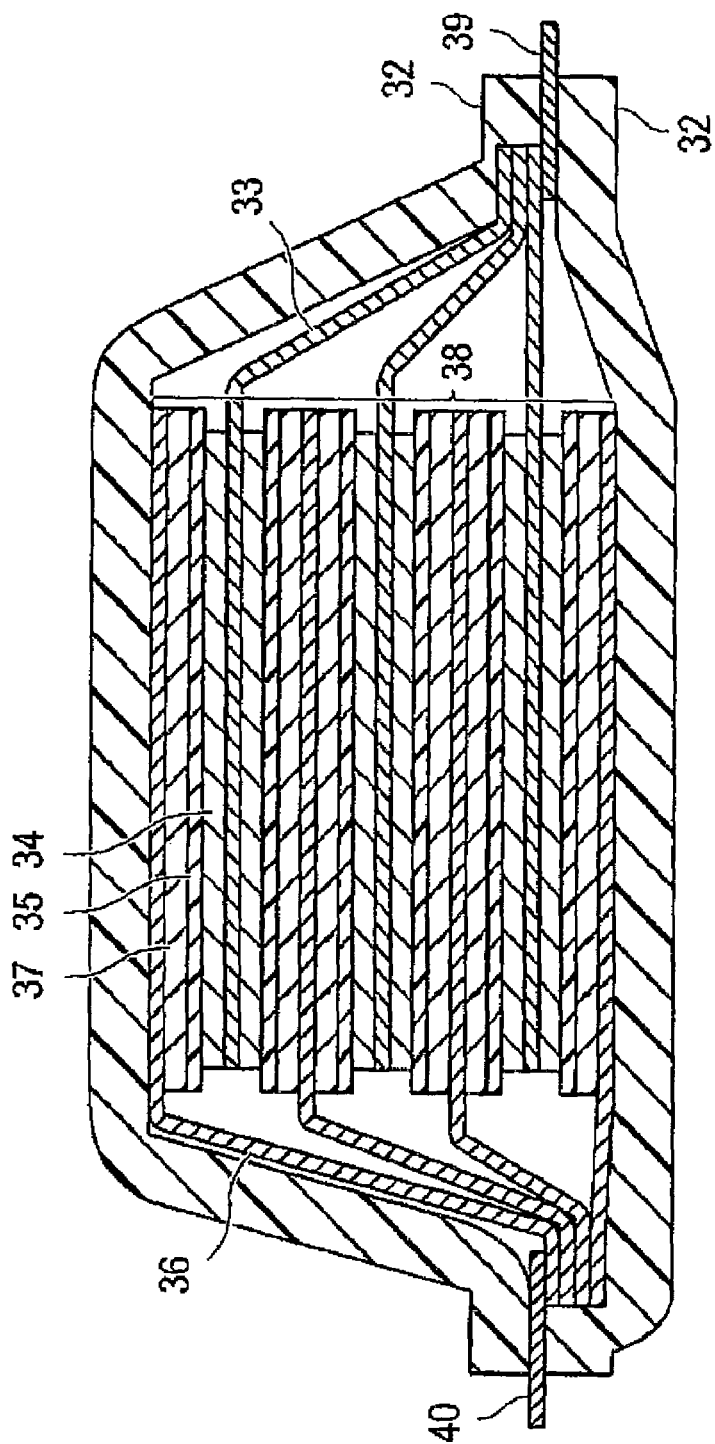
FIG. 2 shows a sectional schematic view of a non-bipolar type flat type (stacked type) nonaqueous electrolyte lithium ion secondary battery.

FIG. 2 shows a sectional schematic view of a non-bipolar type flat type (stacked type) nonaqueous electrolyte lithium ion secondary battery. In a lithium ion secondary battery 31 shown in FIG. 2, a laminate film obtained by compounding a polymer and a metal is used for a battery sheath material 32. A power generation element 38 is stored and sealed by bonding all of the peripheral part of the battery sheath material 32 by heat fuse. The power generation element 38 is obtained by stacking a positive electrode plate obtained by forming a positive electrode active material layer 34 on both surfaces of a positive electrode current collector 33, an electrolyte layer 35, and a negative electrode plate obtained by forming a negative electrode active material layer 37 on both surfaces (one surface for the undermost and uppermost layers of the power generation element) of a negative electrode current collector 36. Alternatively, a positive electrode (terminal) lead 39 and a negative electrode (terminal) lead 40 conducted to each of the above electrode plates (the positive electrode plate and the negative electrode plate) are attached to the positive electrode current collector 33 and negative electrode current collector 36 of each of the electrode plates by ultrasonic welding and resistance welding or the like. The leads 39, 40 are sandwiched by the above thermally fused part to be exposed to the exterior of the above battery sheath material 32.

Figure 3:
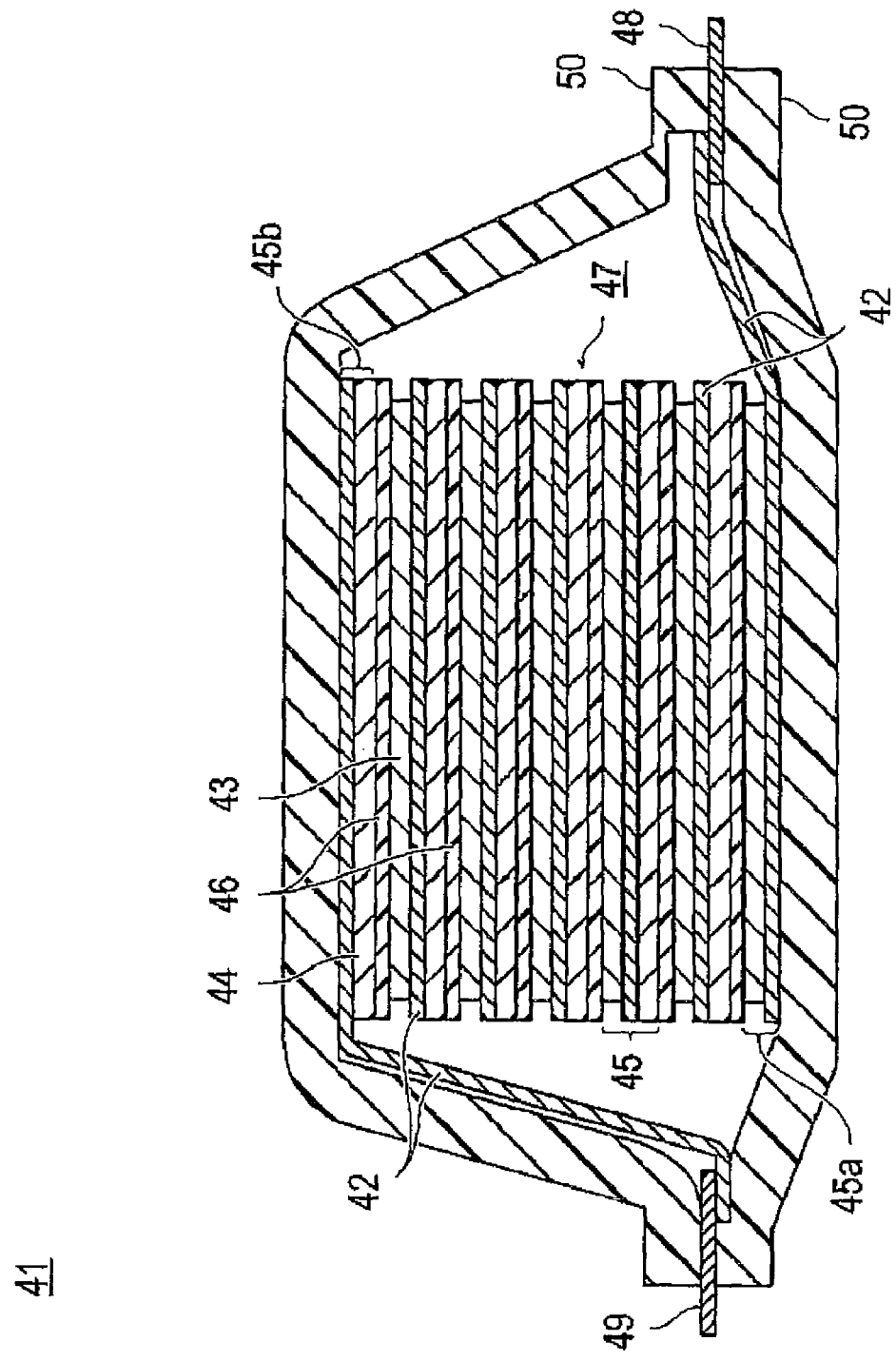
FIG. 3 shows a schematic sectional view schematically representing the whole structure of a bipolar type nonaqueous electrolyte lithium ion secondary battery.

FIG. 3 shows a schematic sectional view schematically representing the whole structure of a bipolar type nonaqueous electrolyte lithium ion secondary battery (hereinafter, also referred to as bipolar battery). As shown in FIG. 3, in a bipolar battery 41, a bipolar electrode 45 is obtained by providing a positive electrode active material layer 43 on one surface of a current collector 42 constituted by at least one sheet and providing a negative electrode active material layer 44 on the other surface. The positive electrode active material layer 43 and negative electrode active material layer 44 of the bipolar electrode 45, which are adjacent so as to sandwich an electrolyte layer 46, face with each other.

That is, the bipolar battery 41 is constituted by an electrode stacked body (bipolar battery main body) 47 obtained by stacking the plurality of bipolar electrodes 45 via the electrolyte layers 46. Each of the plurality of bipolar electrodes 45 has the current collector 42 having a first surface on which the positive electrode active material layer 43 is provided and a second surface on which the negative electrode active material layer 44 is provided. Alternatively, the uppermost and lowermost electrodes 45a, 45b of the electrode stacked body 47 obtained by stacking the plurality of bipolar electrodes 45 may not have a bipolar electrode structure. The electrodes 45a, 45b may have a structure where the positive electrode active material layer 43 or negative electrode active material layer 44 having only one surface required for the current collector 42 (or a terminal) is provided. Alternatively, in the bipolar battery 41, a positive electrode lead 48 and a negative electrode lead 49 are respectively bonded to the current collectors 42 of upper and lower ends.

The number of times of stack of the bipolar electrodes 45 (including electrodes 45a, 45b) is adjusted according to a desired voltage. Alternatively, as long as the output of the battery can be sufficiently secured even when the thickness of the battery is reduced as much as possible in the bipolar battery 41, the number of times of stack of the bipolar electrodes 45 may be lessened. Alternatively, in order to prevent shock from the outside and environmental degradation when the bipolar battery 41 of the present invention is used, the electrode stacked body 47 may be decompressed and encapsulated in the battery sheath material (exterior package) 50, and the electrode leads 48, 49 may be taken out to the exterior of the battery sheath material 50.

The basic constitution of this bipolar battery 41 means a structure where a plurality of stacked unit battery layers (single cells) are connected in series. Since this bipolar type nonaqueous electrolyte lithium ion secondary battery is fundamentally the same as the above non-bipolar type nonaqueous electrolyte lithium ion secondary battery except that the electrode structure thereof is different, each of structure members will be collectively described below.

[Current Collector]

The current collector capable of being used in the present invention is not particularly limited, and conventionally known current collectors can be used. For example, an aluminum foil, a stainless steel (SUS) foil, a cladding material of nickel and aluminum, a cladding material of copper and aluminum, a cladding material of SUS and aluminum, or a plating material obtained by combining these metals can be preferably used. Alternatively, the current collector may be obtained by covering the surface of the metal with aluminum. Alternatively, a current collector obtained stacking a plurality of metallic foils may be used in some cases. When a composite current collector is used, for example, conductive metals such as aluminum, an aluminium alloy, SUS and titanium can be used as the material of the positive electrode current collector, and aluminum is preferable.

On the other hand, for example, conductive metals such as copper, nickel, silver and SUS can be used as the material of the negative electrode current collector. SUS and nickel or the like are preferable. In addition, in the composite current collector, the positive electrode current collector and the negative electrode current collector may be electrically connected directly with each other or via an intermediate layer made of a third material and having a conductivity. Alternatively, a flat plate (foil) can be used for the positive electrode current collector and the negative electrode current collector. In addition, a lath plate, i.e., a plate having a network space formed by expanding the plate with a cut can be also used.

Although the thickness of the current collector is not particularly limited, the thickness is typically about 1 to 100 μm.

[Positive Electrode Active Material Layer]

Since the composite positive electrode material of the present invention, which is used as the constituting material of the positive electrode active material layer herein, has been already described, the description is omitted herein.

The thickness of the positive electrode active material layer, which is not particularly limited, should be determined in view of the usage purpose of the battery (output significant concern and energy significant concern or the like) and the ion conductivity. The thickness of the positive electrode active material layer is generally about 1 to 500 μm. The positive electrode active material layer having a thickness in this range can be sufficiently used even in the present invention.

[Negative Electrode Active Material Layer]

The negative electrode active material layer contains a negative electrode material active material. In addition, the negative electrode active material layer may contain a conductive additive for enhancing the electronic conductivity, a binder, a supporting electrolyte (lithium salt) for enhancing the ion conductivity, a polymer gel or a solid electrolyte (a host polymer and an electrolysis solution or the like). Since contents except the kinds of the negative electrode active material are fundamentally the same as those already described as "the composite positive electrode material for lithium ion batteries" of the present invention, the description thereof is omitted herein.

As the negative electrode active material, a negative electrode active material used even in a conventionally known solution system lithium ion battery can be used. Specifically, a negative electrode active material mainly containing at least one kind selected from carbon materials such as natural graphite, artificial graphite, amorphous carbon, coke and mesophase pitch carbon fiber, graphite, and hard carbon as amorphous carbon is preferably used. However, the negative electrode active material is not particularly limited. In addition, a metal oxide (particularly, a transition metal oxide, and specifically, titanium oxide), and a composite oxide of a metal (particularly, a transition metal, and specifically, titanium) and lithium, or the like can be also used.

The electrolyte contained in the negative electrode active material layer further may contain a film-forming material. Thereby, the capacity deterioration of the battery accompanied by the charge/discharge cycles can be suppressed. The film-forming material is not particularly limited. For example, conventionally known film-forming materials such as a film-forming material described in Japanese Patent Application Laid-Open No. 2000-123880 can be used.

The thickness of the negative electrode active material layer, which is not particularly limited, should be determined in view of an intended use of the battery (output significant concern and energy significant concern or the like) and the ion conductivity. The thickness of the negative electrode active material layer is generally about 1 to 500 µm. The negative electrode active material layer having a thickness of this range can be sufficiently used even in the present invention.

[Electrolyte Layer]

The present invention can be applied to any of a separator impregnated with an electrolysis solution (a), a polymer gel electrolyte (b) and a polymer solid electrolyte (c) according to an intended use of the present invention.

Separator Impregnated with Electrolysis Solution (a)

Since the same electrolysis solution as the already described electrolysis solution (an electrolyte salt and a plasticizer) contained in the polymer gel electrolyte can be used as the electrolysis solution with which the separator can be impregnated, the description thereof is omitted herein. However, when a preferable example of electrolysis solutions is shown, at least one kind of $LiClO_4$, $LiAsF_6$, $LiPF_6$, $LiBF_4$, $LiCF_3SO_3$, $Li(CF_3SO_2)_2N$ and $Li(C_2F_5SO_2)_2N$ is used as the electrolyte, and at least one kind from ethers such as ethylene carbonate (EC), propylene carbonate, diethyl carbonate (DEC), dimethyl carbonate, methyl ethyl carbonate, 1,2-dimethoxy ethane, 1,2-diethoxy ethane, tetrahydrofuran, 1,3-dioxolane and γ-butyllactone is used as the solvent. The electrolyte is dissolved in the solvent to adjust the concentration of the electrolyte to 0.5 to 2 mol/l. However, the present invention should not be limited thereto in any way.

The above separator should not be particularly limited, and conventionally known separators can be used. For example, a porous sheet (for example, a polyolefin based fine porous separator or the like) made of a polymer absorbing and holding the above electrolysis solution and a nonwoven fabric separator or the like can be used. The above polyolefin based fine porous separator having properties of being chemically stable to an organic solvent has superior effects of being capable of suppressing the reactivity with the electrolyte (electrolysis solution).

Examples of the materials of the porous sheets such as the above polyolefin based fine porous separator include polyethylene (PE), polypropylene (PP) and a stacked body having a three-layer structure of PP/PE/PP.

As the material of the nonwoven fabric separator, for example, conventionally known materials such as cotton, rayon, acetate, nylon, polyester, polypropylene, polyolefin such as polyethylene, polyimide and aramid can be used. They are used alone or combination thereof according to an intended use (the mechanical strength or the like required for the electrolyte layer).

Alternatively, the bulk density of the nonwoven fabric should not be particularly limited as long as battery characteristics can be sufficiently obtained by the impregnated polymer gel electrolyte. That is, this is because the rate of a non-electrolyte material in the electrolyte layer may be excessively large to impair the ion conductivity of the electrolyte layer when the bulk density of the nonwoven fabric is excessively large.

The thickness of the above separator (including the nonwoven fabric separator) cannot be univocally specified since the thickness is different according to the usage application. However, in the applications of motor-driving secondary batteries such as an electromobile (EV) and a hybrid electromobile (HEV) or the like, the thickness is preferably 5 to 200 µm. The separator having a thickness in this range can maintain the property and suppress the increase in resistance. Alternatively, the separator effectively secures the mechanical strength and high output in the thickness direction for reasons of the prevention of short circuit generated when fine particles enter in the separator and a desirable narrow distance between electrodes for high output. Alternatively, since the electrode area is increased when a plurality of batteries are connected, a thick separator having the above range is preferably used in order to enhance the reliability of the battery.

The maximum diameter of the pores of the above separator (the polyolefin based fine porous separator or the like) is preferably is 1 µm or less (typically a pore diameter of about several tens of nm). When the mean diameter of the pores of the separator is in the above range, the "shutdown phenomenon" in which heat fuses the separator to close the pores occurs promptly. The reason effectively provides the enhanced reliability in the abnormality, and as the result, the enhanced heat resistance. That is, when the battery temperature is risen by overcharging (in the abnormality), the "shutdown phenomenon" in which the separator is fused to close the pores occurs promptly. Thereby the Li ions cannot pass to the negative electrode (−) side from the positive electrode (+) side of the battery (electrode), and the battery is not charged any further. Therefore, the battery cannot be overcharged to eliminate the overcharging. As a result, the heat resistance (safety) of the battery is enhanced, and in addition, gas comes out to prevent the thermally fused part (sealed part) of the battery sheath material from opening. Herein, the separator is observed using a scanning electron microscope or the like, and the mean diameter of the pores of the separator is calculated as a mean diameter obtained by statistically processing the photograph using an image analyzer or the like.

The porosity of the above separator (polyolefin based fine porous separator or the like) is preferably 20 to 65%. The separator having a porosity of the above range effectively secures both the output and the reliability for reasons of both the prevention of the output deterioration caused by the resistance of the electrolyte (electrolysis solution) and the prevention of the short circuit caused by the fine particles penetrating holes (pores) of the separator. Herein, the porosity of the separator is calculated as a volume ratio from the density of a resin as a raw material and the density of the separator as an end product.

Alternatively, the porosity of the nonwoven fabric separator is preferably 50 to 90% from the viewpoint of securing the holding property of the electrolyte and the strength of the separator well.

The above separator may be impregnated with the electrolysis solution so that the impregnating amount of the electrolysis solution to the separator is within the range of the liquid-retaining ability of the separator. However, the separator may be impregnated with the electrolysis solution so that the impregnating amount exceeds the range of the liquid-retaining ability. Since a resin is injected into the electrolyte sealed part to prevent the oozing out of the electrolysis solution from the electrolyte layer, the electrolysis solution can be impregnated in a range where the electrolysis solution can be held in the electrolyte layer. The separator can be impregnated with the electrolysis solution by conventionally known methods such as a method for injecting the electrolysis solution using a vacuum liquid injecting method or the like to enable the complete seal.

Polymer Gel Electrolyte (b) and Polymer Solid Electrolyte (c)

Since the same polymer gel electrolyte and polymer solid electrolyte as the polymer gel electrolyte and the polymer solid electrolyte in the paragraph of "the composite positive electrode material for nonaqueous electrolyte lithium ion batteries" of the present invention already described can be used, the description thereof is omitted herein.

The above electrolyte layers (a) to (c) may be used together in one battery.

Further, the polymer gel electrolyte layer, the positive electrode active material layer and the negative electrode active material layer may contain the polymer electrolyte. However, the same polymer electrolyte may be used, and a different polymer electrolyte may be used according to the layer.

The thickness of the electrolyte layer constituting the battery is not particularly limited. However, the thickness is preferably thinned as much as possible in a range where the function as the electrolyte can be secured in order to obtain a compact battery. The thickness of the electrolyte layer is preferably 5 to 200 μm.

[Insulative Layer]

The insulative layer is mainly used in the case of the bipolar battery. This insulative layer is formed around each of electrodes in order to prevent short circuit caused by adjacent current collectors brought into contact with each other in the battery and slight irregularity of end parts of stacked electrodes or the like. In the present invention, the insulative layer may be provided around the electrode if needed. This is because the short circuit (solution drop) caused by the electrolysis solution needs to be completely prevented when using as a vehicle driving or auxiliary power source. Furthermore, vibration and shock to the battery are loaded over a long period of time. This is because the insulative layer is preferably set in order to secure reliability and safety for a longer period from the viewpoint of the lengthening of the battery life, and a high-quality mass power supply can be preferably provided.

The insulative layer is required only to have insulation property, sealing property to coming-off of the solid electrolyte and sealing property (sealing performance) to moisture permeation from the outside, and heat resistance at a battery operation temperature. For example, an epoxy resin, rubber, polyethylene, polypropylene and polyimide or the like can be used. The epoxy resin is preferable from the viewpoints of corrosion resistance, chemical resistance, easy producibility (film-forming property) and economical efficiency, and the like.

[Positive Electrode Terminal Plate and Negative Electrode Terminal Plate]

The positive electrode terminal plate and negative electrode terminal plate may be used if needed. For example, an electrode terminal may be directly taken out from the outermost current collector in some stacking (or winding) structures in the case of the bipolar type lithium ion battery. In this case, the positive electrode terminal plate and negative electrode terminal plate may not be used (see FIG. 3).

When the positive electrode terminal plate and negative electrode terminal plate are used, the positive electrode terminal plate and negative electrode terminal plate have a function as a terminal and are preferably thinner as much as possible from the viewpoint of thinning. However, since any of the stacked electrode, electrolyte and current collector has a low mechanical strength, it is preferred that the positive electrode terminal plate and negative electrode terminal plate have a strength for sandwiching and supporting the electrode, the electrolyte and the current collector from both the sides. Furthermore, it can be said that the thickness of each of the positive electrode terminal plate and negative electrode terminal plate is preferably about 0.1 to 2 mm from the viewpoint of suppressing the internal resistance in a terminal part typically.

Conventionally known materials used in lithium ion batteries can be used for the materials of the positive electrode terminal plate and negative electrode terminal plate. For example, aluminum, copper, titanium, nickel, stainless steel (SUS) and an alloy thereof or the like can be used. Aluminum is preferably used from the viewpoints of corrosion resistance, easy producibility and economical efficiency, and the like.

The same material may be used for the materials of the positive electrode terminal plate and negative electrode terminal plate, and the different material may be used. Furthermore, these positive electrode terminal plate and negative electrode terminal plate may be obtained by stacking different materials into multiple layers.

[Positive Electrode Lead and Negative Electrode Lead]

For the positive electrode lead and negative electrode lead, the same lead as one used in not only a bipolar type, but conventionally known non-bipolar type lithium ion batteries can be used. A portion taken out from the battery sheath material (battery case) is preferably covered with a heat-resistant insulative heat contraction tube or the like in order to prevent the possibility that the portion is brought into contact with peripheral devices and wirings or the like to cause earth leakage to affect products (for example, autoparts, particularly electronic devices or the like).

[Battery Sheath Material (Battery Case)]

It is preferable that a battery stacked body as a battery main body or a battery winding body is wholly stored in the battery sheath material or the battery case in order to prevent shock from the outside and environmental degradation in using not only the bipolar type but the lithium ion batteries. It is preferable that conventionally known battery sheath materials such as a polymer-metal composite laminate film obtained by covering both the surfaces of metal (including an alloy) such as aluminum, stainless steel, nickel and copper with an insulator (preferably, a heat-resistant insulator) such as a polypropylene film are used from the viewpoint of the weight saving, and a part or all of the peripheral part of the battery sheath material is bonded by heat fuse to store and seal the battery stacked body.

In this case, the above positive electrode lead and negative electrode lead may be sandwiched by the above thermally fused part to be exposed to the exterior of the above battery sheath material. Further, the polymer-metal composite laminate film or the like excellent in thermal conductivity is preferably used in that heat can be efficiently transmitted from a heat source of a vehicle and the inside of the battery can be quickly heated to a battery operation temperature. The polymer-metal composite laminate film should not be particularly limited, and conventionally known films obtained by disposing a metal film between polymer films and integrally stacking the films wholly can be used. Specific examples thereof include a polymer-metal composite laminate film obtained by arranging an exterior protective layer (laminate outermost layer) made of the polymer film, a metal film layer, and a heat fuse layer (laminate innermost layer) made of the polymer film and integrally stacking the layers wholly. In detail, the polymer-metal composite laminate film used for the sheath material is obtained by first forming a heat-resistant insulative resin film as a polymer film on both the surfaces of the above metal film and stacking a heat fuse insulative film on at least the heat-resistant insulative resin film of one surface side. A heat fuse insulative film part is fused and bonded by thermally fusing such a laminate film using a suitable method to form a thermally fused part.

As the above metal film, an aluminum film or the like can be exemplified. As the above insulative resin film, a polyethylene tetraphthalate film (heat-resistant insulative film), a nylon film (heat-resistant insulative film), a polyethylene film (heat fuse insulative film), a polypropylene film (heat fuse insulative film) or the like can be exemplified. However, the sheath material of the present invention should not be limited thereto. In such a laminate film, one pair or one sheet (bag-shaped) of the laminate film can be easily and certainly bonded by the heat fuse using the heat fuse insulative film by ultrasonic welding or the like. The metal films as the structure member of the laminate sheet may be directly bonded with each other in order to maximally enhance the long-term reliability of the battery. Ultrasonic welding can be used in order to remove or break a thermally fusible resin between the metal films to bond the metal films with each other.

The application of the battery of the present invention is not particularly limited. However, the battery can be used for electronic devices such as a notebook PC, an electronic book player, a DVD player, a portable audio player, a video movie, a portable television device and a cellular phone as well as applications for a driving power supply and auxiliary power supply for an electromobile, a hybrid electromobile, a fuel cell vehicle and a hybrid fuel cell vehicle or the like. The battery can be further used for consumer appliances such as a cordless cleaner and a cordless power tool. Of these, particularly, the battery is suitably used as the battery for vehicles requiring high output.

Hereinafter, Examples or the like specifically showing the present invention will be described. Evaluation items in Examples or the like were measured as follows.

(1) DBP Absorption Amount

The DBP absorption amount was measured based on JISK 6217-4.

(2) Average Particle Diameter of Conductive Material and Primary Particle Diameter of Positive Electrode Active Material The laser diffraction/dispersion type particle distribution measurement device LA750 (manufactured by Horiba, Ltd.) was used, and ethanol was used as a dispersion medium. When the particle size distribution after applying ultrasonic waves for 1 minute was measured at a relative refractive index of 1.5 in the conductive material and at a relative refractive index of 1.7 in the positive electrode active material, the values of volume middle particle diameters (D50) were defined as the average particle diameter of the conductive material and the primary particle diameter of the positive electrode active material.

(3) Primary Particle Diameter of Carbon Black

Fifty primary particles were extracted from a SEM image photographed by a field emission type scanning electron microscope (S-4000 manufactured by Hitachi, Ltd.), and the average value obtained by measuring the diameters of the primary particles was defined as the primary particle diameter.

(4) Fiber Diameter and Fiber Length of Fibrous Carbon

Thirty fibers were extracted from the SEM image photographed by the field emission type scanning electron microscope (S-4000 manufactured by Hitachi, Ltd.). The average value obtained by measuring the fiber diameters of the fibers was defined as the fiber diameter. Alternatively, the result obtained by measuring and averaging the lengths of the fibers was defined as the fiber length.

(5) Aspect Ratio of Fibrous Carbon

The aspect ratio of the fibrous carbon was determined by dividing the fiber length of the fibrous carbon by the fiber diameter.

(6) Aspect Ratio of Carbon Black

Thirty carbon black secondary agglomerates having primary particles tied in queue were extracted using a SEM image photographed by a field emission type scanning electron microscope (S-4000 manufactured by Hitachi, Ltd.). The ratio of the longest diameter (L) and shortest diameter (W) thereof, i.e., the average value of L/W was determined as an aspect ratio.

(7) Volume Resistivity

The values of a powder sample amount and a pressure in powder compression were respectively changed to 0.3 g and 100 kg/cm$^2$ based on JIS K 1469, and the electric resistance values of cylindrically compressed powder samples were measured. The volume resistivities (electric resistivities) were calculated by the following formula I from the measured resistance values.

Specifically, a cylindrical container which includes an insulative cylinder (made of bakelite, outer diameter: 28 mm, inner diameter: 8 mm) and a (minus) electrode was filled with 0.3 g of a powder sample. A (plus) electrode was inserted into the insulative cylindrical container filled with the sample to sandwich the powder sample between the (minus) electrode and the (plus) electrode. The cylindrical container was provided on a pressing machine mount. A force of 100 kg/cm$^2$ was applied to the sample in the cylindrical container by a pressing machine to compress the sample. The (plus) electrode and the (minus) electrode were connected to input measuring cables of a digital multi-meter. The electric resistance value was measured after an elapse of three minutes since the initiation of compression.

$$\rho = S/h \times R \quad \text{(formula 1)}$$

Wherein $\rho$ is an electric resistivity ($\Omega \cdot cm$); S is a cross section area (cm$^2$) of a sample; and h is a filling height (cm) of the sample; and R is an electric resistance value ($\Omega$).

The used (minus) electrode, which was made of brass, had an electrode surface having a diameter of 7.8±1 mm$\phi$, and was a pedestal-shaped electrode having a projection part having a height of 5 mm. The (plus) electrode, which was made of brass, had an electrode surface having a diameter of 7.8±1 mm$\phi$, and was a rod-shaped electrode having a length of 60 mm.

(8) Production of Batteries 3 parts by weight of a polyvinylidene difluoride powder (#1300 manufactured by Kureha Corporation) and 45 parts by weight of NMP were uniformly mixed with 27 parts by weight of a powder sample to prepare a coating paste. The paste was uniformly coated on an aluminum foil (thickness: 20 μm) used as a current collector using a coater, and was dried at 140° C. for 10 minutes or more. After the paste was dried, the obtained film was molded to a uniform film thickness by a pressing machine, and the film was cut in a predetermined size (20 mm×15 mm) to produce a test positive electrode. The thickness of an electrode active material layer at this time was 25 μm.

A test cell was produced using the above test positive electrode. A metal lithium foil cut to a predetermined size was used for a negative electrode, and Cell Guard #2400 (manufactured by Cell Guard Corporation) was used as a separator.

1 mol/l of LiPF$_6$/ethylene carbonate (EC): diethyl carbonate (DEC) (EC:DEC=1:1 vol %) was used as an electrolysis solution. The test cell was assembled in a glove box under an argon atmosphere. The high-rate discharge characteristics of the test cell were evaluated after leaving the test cell at 25° C. for 24 hours after assembling the test cell.

(9) Evaluation of High-Rate Discharge Characteristics

The test cell was charged and discharged with a constant current in 0.2 C. Then (1) a discharge capacity (A) of the test cell was measured after charging the test cell with a constant current in 0.5 C and discharging the test cell with a constant current in 1 C and (2) a discharge capacity (B) of the test cell was measured after charging with a constant current in 0.5 C and discharging the test cell with a constant current in 60 C. A ratio of A and B was defined as high-rate discharge characteristics.

High-rate discharge characteristics (%)=$B/A \times 100$

(10) Total Pore Volume

A pore volume of 0.008 μm to 200 μm was measured using a mercury injection pore size distribution measurement device (Poresizer 9320 manufactured by Shimadzu Corporation), and the obtained value was defined as the total pore volume.

(11) Autoagglutination Test 2 g of a conductive material is added into 500 g of ethanol, and ultrasonic waves are applied for 1 minute in a frequency of 19 kHz and an output of 300 W using an ultrasonic homogenizer (MODELUS-300T manufactured by NISSEI Corporation). The application of the ultrasonic waves is then stopped. About 1 cc of a sampling liquid is sampled immediately after stopping the application, and the average particle diameter (A) of the sampling liquid is promptly measured in a relative refractive index 1.5 without applying ultrasonic waves using ethanol as the dispersion medium in the laser diffraction/dispersion type particle distribution measurement device LA750 (manufactured by Horiba, Ltd.). Next, the dispersion liquid of the conductive material is sampled after an elapse of 3 minutes since the application of the ultrasonic waves is stopped, and the average particle diameter (B) thereof is measured by the above LA750 on the same measurement conditions as those of the average particle diameter (A). The sampling liquid having a value of 2 or more was defined as a conductive material having autoagglutination, the value obtained by dividing the average particle diameter (B) by the average particle diameter (A).

Table 1 shows the evaluation results in that case.

TABLE 1

| | | average particle diameter (μm) | | |
|---|---|---|---|---|
| | | (A) immediately after stopping ultrasonic waves | (B) after being quietly placed for 3 minutes after stopping ultrasonic waves | particle diameter ratio B/A |
| autoagglutination | CNT | 32 | 96 | 3.0 |
| | ketjen black | 11 | 38 | 3.5 |
| | VGCF | 4.4 | 47 | 10.7 |
| non-autoagglutination | carbon black (#5500) | 5 | 9.5 | 1.9 |
| | carbon black (HS-100) | 3 | 5 | 1.7 |

(12) Surface Covering Rate of Composite Particles

SEM-EDS analysis was conducted by the field emission type scanning electron microscope (S-4000 manufactured by Hitachi, Ltd.), and the surface covering rate of carbon was determined.

EXAMPLE 1

Into 100 parts by weight of ethanol, 0.4 part by weight of carbon black (#5500 manufactured by Tokai Carbon Co., Ltd.) having an average particle diameter of 2 μm (primary particle diameter: 25 nm) and a DBP absorption amount of 155 cm$^3$/100 g was added. The carbon black was dispersed by ultrasonic waves using an ultrasonic type disperser. The dispersion state was a forcibly dispersed state. Into this dispersion liquid, 20 parts by weight of lithium manganate having a primary particle diameter of 0.8 μm was added, and they were further dispersed by ultrasonic waves. The obtained slurry was evaporated to be dry-cured to obtain a powder (composite particles I, surface coating ratio: 24%) obtained by sticking fine particle carbon black to the surface of the lithium manganate. 2.1 parts by weight of carbon black (HS-100 manufactured by Denki Kagaku Kogyo Kabushiki Kaisha, DBP absorption amount: 140 cm$^3$/100 g) having an average particle diameter of 1 μm and an aspect ratio of 3.8 was then added into 100 parts by weight of ethanol, and they were stirred by a T.K.homodisper. Next, 20.4 parts by weight of the composite particles I was added thereto, and they were mixed by the T.K.homodisper. The obtained slurry was evaporated to be dry-cured to obtain a composite positive electrode material 1. Table 2 shows the physical properties of the obtained composite positive electrode material 1.

EXAMPLE 2

Into 100 parts by weight of ethanol, 0.4 part by weight of ketjen black having an average particle diameter of 10 μm (primary particle diameter: 34 nm) and a DBP absorption amount of 495 cm$^3$/100 g was added. The ketjen black was dispersed by ultrasonic waves using an ultrasonic type disperser. 20.4 parts by weight of the composite particles I produced in Example 1 was added thereto, and they were dispersed by ultrasonic waves. The obtained slurry was evaporated to be dry-cured to obtain composite particles II. 1.9 parts by weight of carbon black (HS-100 manufactured by Denki Kagaku Kogyo Kabushiki Kaisha, DBP absorption amount: 140 cm$^3$/100 g) having an average particle diameter of 1 μm and an aspect ratio of 3.8 was then added into 100 parts by weight of ethanol, and they were stirred by a T.K.homodisper. Next, 20.8 parts by weight of the composite particles II were added thereto, and they were mixed by the T.K. homodisper. The obtained slurry was evaporated to be dry-cured to obtain a composite positive electrode material 2. Table 2 shows the physical properties of the obtained composite positive electrode material 2. In addition, FIG. 1 shows the scanning electron microscope (SEM) photograph of the obtained composite positive electrode material.

EXAMPLE 3

Into 100 parts by weight of NMP, 0.4 part by weight of ketjen black having an average particle diameter of 10 μm (primary particle diameter: 34 nm) and a DBP absorption amount of 495 cm$^3$/100 g was added, and the ketjen black was dispersed by ultrasonic waves using an ultrasonic type disperser. Next, 0.4 part by weight of carbon black (#5500 manufactured by Tokai Carbon Co., Ltd.) having an average particle diameter of 2 μm (primary particle diameter: 25 nm) and a DBP absorption amount of 155 cm$^3$/100 g was added thereto, and they were dispersed by ultrasonic waves. While ultrasonic waves were applied to this carbon dispersion liquid, 20 parts by weight of lithium manganate having a primary particle diameter of 0.8 μm was added thereto, and they were further dispersed by ultrasonic waves to be in a forcibly dispersed state. The application of the ultrasonic waves was then stopped to autoagglutinate the ketjen black in the NMP to obtain a slurry containing composite particles III. Into this slurry, 1.9 parts by weight of carbon black (HS-100 manufactured by Denki Kagaku Kogyo Kabushiki Kaisha, DBP absorption amount: 140 cm$^3$/100 g) having an average particle diameter of 1 μm and an aspect ratio of 3.8 were added, and they were stirred by a T.K.homodisper to obtain a slurry containing a composite positive electrode material 3. Although this slurry into which necessary components were added could be used for forming the positive electrode in a liquid state, a solvent was distilled for evaluating the physical properties to obtain the composite positive electrode material 3. Table 2 shows the physical properties of the obtained composite positive electrode material 3.

EXAMPLE 4

Into 100 parts by weight of ethanol, 0.4 part by weight of a carbon nanotube having a fiber diameter of 20 nm, a fiber length of 10 μm and an aspect ratio of 500 was added, and they were dispersed by ultrasonic waves using an ultrasonic type disperser. 20.4 parts by weight of the composite particles I produced in Example 1 was added thereto, and they were dispersed by ultrasonic waves. The obtained slurry was evaporated to be dry-cured to obtain composite particles IV. Into 100 parts by weight of ethanol, 1.9 parts by weight of carbon black (HS-100 manufactured by Denki Kagaku Kogyo Kabushiki Kaisha, DBP absorption amount: 140 cm$^3$/100 g) having an average particle diameter of 1 μm and an aspect ratio of 3.8 were then added, and they were stirred by a T.K.homodisper. Next, 20.8 parts by weight of the composite particles IV was added thereto, and they were mixed by the T.K. homodisper. The obtained slurry was evaporated to be dry-cured to obtain a composite positive electrode material 4. Table 2 shows the physical properties of the obtained composite positive electrode material 4.

EXAMPLE 5

Into 100 parts by weight of NMP, 0.4 part by weight of VGCF having a fiber diameter of 120 nm, a fiber length of 10 μm and an aspect ratio of 83 was added, and the VGCF was dispersed by ultrasonic waves using an ultrasonic type disperser. Next, 0.4 part by weight of carbon black (#5500 manufactured by Tokai Carbon Co., Ltd.) having an average particle diameter of 2 μm (primary particle diameter: 25 nm) and a DBP absorption amount of 155 cm$^3$/100 g was added thereto, and they were dispersed by ultrasonic waves. While ultrasonic waves were applied to this carbon dispersion liquid, 20 parts by weight of lithium manganate having a primary particle diameter of 0.8 μm was added thereto, and they were further dispersed by ultrasonic waves to be in a forcibly dispersed state. The application of the ultrasonic waves was then stopped to autoagglutinate the VGCF in the NMP to obtain a slurry containing the composite particles V. Into this slurry, 1.9 parts by weight of carbon black (HS-100 manufactured by Denki Kagaku Kogyo Kabushiki Kaisha, DBP absorption amount: 140 cm$^3$/100 g) having an average particle diameter of 1 μm and an aspect ratio of 3.8 were added, and they were stirred by a T.K.homodisper to obtain a slurry containing a composite positive electrode material 5. Although this slurry into which necessary components were added could be used for forming the positive electrode in a liquid state, a solvent was distilled for evaluating the physical properties to obtain the composite positive electrode material 5. Table 2 shows the physical properties of the obtained composite positive electrode material 5.

EXAMPLE 6

A composite positive electrode material 6 was obtained in the same manner as in Example 2 except that lithium manganate having a primary particle diameter of 0.5 μm was used. Table 2 shows the physical properties of the obtained composite positive electrode material 6.

EXAMPLE 7

A composite positive electrode material 7 was obtained in the same manner as in Example 1 except that lithium manganate having a primary particle diameter of 1.2 μm was used. Table 2 shows the physical properties of the obtained composite positive electrode material 7.

EXAMPLE 8

A composite positive electrode material 8 was obtained in the same manner as in Example 2 except that lithium manganate having a primary particle diameter of 1.2 μm was used. Table 2 shows the physical properties of the obtained composite positive electrode material 8.

EXAMPLE 9

A composite positive electrode material 9 was obtained in the same manner as in Example 1 except that lithium manganate having a primary particle diameter of 10 μm was used. Table 2 shows the physical properties of the obtained composite positive electrode material 9.

EXAMPLE 10

A composite positive electrode material 10 was obtained in the same manner as in Example 2 except that lithium manganate having a primary particle diameter of 10 μm was used.

Table 2 shows the physical properties of the obtained composite positive electrode material 10.

EXAMPLE 11

A composite positive electrode material 11 was obtained in the same manner as in Example 1 except that lithium manganate having a primary particle diameter of 1.2 μm and carbon black #3800 (primary particle diameter: 70 nm) manufactured by Tokai Carbon Co., Ltd. were used. Table 2 shows the physical properties of the obtained composite positive electrode material 11.

COMPARATIVE EXAMPLE 1

10.5 parts by weight of carbon black (HS-100 manufactured by Denki Kagaku Kogyo Kabushiki Kaisha) having an average particle diameter of 1 μm (primary particle diameter: 25 nm) and a DBP absorption amount of 140 cm$^3$/100 g was dry-mixed with 100 parts by weight of lithium manganate having a primary particle diameter of 0.8 μm to obtain a comparative positive electrode material 1. Table 2 shows the physical properties of the obtained comparative positive electrode material 1.

TABLE 2

| | (a) Positive electrode active material | | (b) Conductive material | | | | (b) Conductive material (auto-agglutination) | | | | (c) Conductive material | | |
|---|---|---|---|---|---|---|---|---|---|---|---|---|---|
| | Materials | Primary particle diameter (μm) | Kinds | Primary particle diameter (nm) | *1 | Auto-agglutination | Kinds | Primary diameter particle (nm) | *1 | Auto-agglutination | Coating ratio (%) | Kinds | *2 | Auto-agglutination |
| Ex. 1 | LiMn$_2$O$_4$ | 0.8 | #5500 | 25 | 155 | 1.9 | | | | | 24 | | | |
| Ex. 2 | LiMn$_2$O$_4$ | 0.8 | #5500 | 25 | 155 | 1.9 | Ketjen black | 34 | 495 | 3.5 | — | | | |
| Ex. 3 | LiMn$_2$O$_4$ | 0.8 | #5500 | 25 | 155 | 1.9 | Ketjen black | 34 | 495 | 3.5 | — | | | |
| Ex. 4 | LiMn$_2$O$_4$ | 0.8 | #5500 | 25 | 155 | 1.9 | | | | | — | CNT | 500 | 3 |
| Ex. 5 | LiMn$_2$O$_4$ | 0.8 | #5500 | 25 | 155 | 1.9 | | | | | — | VGCF | 83 | 10.7 |
| Ex. 6 | LiMn$_2$O$_4$ | 0.5 | #5500 | 25 | 155 | 1.9 | Ketjen black | 34 | 495 | 3.5 | — | | | |
| Ex. 7 | LiMn$_2$O$_4$ | 1.2 | #5500 | 25 | 155 | 1.9 | | | | | 30 | | | |
| Ex. 8 | LiMn$_2$O$_4$ | 1.2 | #5500 | 25 | 155 | 1.9 | Ketjen black | 34 | 495 | 3.5 | — | | | |
| Ex. 9 | LiMn$_2$O$_4$ | 10 | #5500 | 25 | 155 | 1.9 | | | | | 30 | | | |
| Ex. 10 | LiMn$_2$O$_4$ | 10 | #5500 | 25 | 155 | 1.9 | Ketjen black | 34 | 495 | 3.5 | — | | | |
| Ex. 11 | LiMn$_2$O$_4$ | 1.2 | #3800 | 70 | 60 | 1.9 | | | | | 20 | | | |
| Comp. Ex. 1 | LiMn$_2$O$_4$ | 0.8 | | | | | | | | | — | | | |

| | Solvents | Compounding method | aspect of composite particles | (d) Conductive material | | | Volume resistivity (Ω·cm) | Total pore volume (cc/g) | High-rate discharge characteristics (%) |
|---|---|---|---|---|---|---|---|---|---|
| | | | | Kinds | Average particle size (μm) | *2 | | | |
| Ex. 1 | EtOH | Dispersion→solvent removal | 1 | HS-100 | 1 | 3.8 | 1.8 | 0.6 | 63 |
| Ex. 2 | EtOH | Dispersion→agglutination→solvent removal | 1 + 2 | HS-100 | 1 | 3.8 | 1.8 | 1.1 | 88 |
| Ex. 3 | NMP | Dispersion→agglutination | 1 + 2 | HS-100 | 1 | 3.8 | 1.6 | 1.1 | 88 |
| Ex. 4 | EtOH | Dispersion→agglutination→solvent removal | 1 + 2 | HS-100 | 1 | 3.8 | 2 | 0.9 | 85 |
| Ex. 5 | EtOH | Dispersion→agglutination→solvent removal | 1 + 2 | HS-100 | 1 | 3.8 | 2.1 | 0.9 | 80 |
| Ex. 6 | EtOH | Dispersion→agglutination→solvent removal | 1 + 2 | HS-100 | 1 | 3.8 | 1.9 | 1.1 | 65 |
| Ex. 7 | EtOH | Dispersion→solvent removal | 1 | HS-100 | 1 | 3.8 | 1.7 | 0.6 | 70 |
| Ex. 8 | EtOH | Dispersion→agglutination→solvent removal | 1 + 2 | HS-100 | 1 | 3.8 | 1.5 | 1.1 | 90 |
| Ex. 9 | EtOH | Dispersion→solvent removal | 1 | HS-100 | 1 | 3.8 | 1.6 | 0.6 | 60 |

TABLE 2-continued

| | | | | | | | | | |
|---|---|---|---|---|---|---|---|---|---|
| Ex. 10 | EtOH | Dispersion→agglutination→solvent removal | 1 + 2 | HS-100 | 1 | 3.8 | 1.4 | 1.1 | 65 |
| Ex. 11 | EtOH | Dispersion→solvent removal | 1 | HS-100 | 1 | 3.8 | 1.6 | 0.6 | 55 |
| Comp. Ex. 1 | None | Powder mixing | Non-compounding | HS-100 | 1 | 3.8 | 6.7 | 0.6 | 50 |

*1: DBP absorption amount (cm³/100 g)
*2: Aspect ratio (—)

The result of Table 2 shows that the composite positive electrode materials of Examples 1 to 11 of the present invention have lower volume resistivity and higher pore volume than those of Comparative Example 1 obtained by dry-mixing the conductive material and the positive electrode active material, and have excellent high-rate discharge characteristics.

The invention claimed is:

1. A composite positive electrode material for a lithium ion battery comprising:
   a positive electrode active material (a);
   a conductive material (b) having a primary particle diameter of 10 to 100 nm;
   a fibrous conductive material (c) having a fiber diameter of 1 nm to 1 μm; and
   a conductive material (d) having an aspect ratio of 2 to 50, wherein
   the composite positive electrode material for a lithium ion battery is obtained by mixing the conductive material (d) with a composition containing the positive electrode active material (a), the conductive material (b) and the conductive material (c), the composition obtained by dispersing the positive electrode active material (a), the conductive material (b) and the conductive material (c) in a solvent to a state where the positive electrode active material (a), the conductive material (b) and the conductive material (c) are forcibly dispersed, and then agglutinating the positive electrode active material (a), the conductive material (b) and the conductive material (c);
   the composite positive electrode material includes a structure where composite particles obtained by sticking the conductive material (b) and the conductive material (c) to the surface of at least one positive electrode active material (a) are formed and the conductive material (d) is interposed between the composite particles, and
   the conductive material (c) is different from the conductive material (d).

2. The composite positive electrode material for a lithium ion battery according to claim 1, wherein composite particles are formed by sticking the conductive material (b) to the surface of the positive electrode active material (a) in a state of having a coating ratio of 5 to 80%.

3. The composite positive electrode material for a lithium ion battery according to claim 1, wherein the conductive material (b) and/or the conductive material (c) have autoagglutination in the solvent.

4. A slurry for positive electrodes for a lithium ion battery comprising:
   the composite positive electrode material for a lithium ion battery according to claim 1; and
   a binder.

5. A positive electrode for a lithium ion battery comprising:
   the composite positive electrode material for a lithium ion battery according to claim 1; and
   a binder.

6. A lithium ion battery comprising a positive electrode comprising:
   the composite positive electrode material for a lithium ion battery according to claim 1; and
   a binder.

* * * * *

UNITED STATES PATENT AND TRADEMARK OFFICE
CERTIFICATE OF CORRECTION

PATENT NO. : 8,003,015 B2
APPLICATION NO. : 12/305914
DATED : August 23, 2011
INVENTOR(S) : Kazuo Oki et al.

It is certified that error appears in the above-identified patent and that said Letters Patent is hereby corrected as shown below:

ON THE TITLE PAGE:

At item (73), Assignees, change:

"Kao Corporation, Tokyo (JP); Nissan Motor Co., Ltd., Yokohama-Shi, Kangawa (JP)"

to:

--Kao Corporation, Tokyo (JP); Nissan Motor Co., Ltd., Yokohama-Shi, Kanagawa (JP)--.

Signed and Sealed this
Twentieth Day of March, 2012

David J. Kappos
*Director of the United States Patent and Trademark Office*